| United States Patent [19] | [11] Patent Number: 4,578,957 |
| Cunningham | [45] Date of Patent: Apr. 1, 1986 |

[54] BY-PRODUCTS CHILLER AND METHOD FOR USING SAME

[76] Inventor: Larry L. Cunningham, R.R. 2, Fort Dodge, Iowa 50501

[21] Appl. No.: 746,241

[22] Filed: Jun. 18, 1985

[51] Int. Cl.⁴ .................................................. F25D 13/06
[52] U.S. Cl. ........................................ 62/63; 62/64;
62/374; 62/375; 62/381
[58] Field of Search .................... 62/63, 64, 374, 375, 62/380, 381

[56] References Cited

U.S. PATENT DOCUMENTS

| 2,794,326 | 6/1957 | Menacci | 62/375 |
| 2,942,429 | 6/1960 | Van Dolah et al. | 62/375 |
| 3,015,219 | 1/1962 | Veyrie | 62/63 |
| 3,092,975 | 6/1963 | Zebarth | 62/375 |
| 3,097,501 | 7/1963 | Pappas | 62/63 |
| 3,213,634 | 10/1965 | Granata | 62/63 |
| 3,395,549 | 8/1968 | Grimes | 62/63 |
| 3,410,101 | 11/1968 | Morris, Jr. | 62/375 |
| 3,426,546 | 2/1969 | Crane | 62/375 |
| 3,446,030 | 5/1969 | Rubin | 62/63 |
| 3,488,973 | 1/1970 | Harben, Jr. et al. | 62/375 |
| 3,498,208 | 3/1970 | Longe et al. | 62/375 |
| 3,555,838 | 1/1971 | Morris, Jr. | 62/375 |
| 3,623,331 | 11/1971 | Buyens | 62/63 |
| 3,906,743 | 9/1975 | Schorsch et al. | 62/374 |
| 3,992,899 | 11/1976 | Spahn | 62/381 |

Primary Examiner—Ronald C. Capossela
Attorney, Agent, or Firm—Zarley, McKee, Thomte, Voorhees & Sease

[57] ABSTRACT

A packing plant by-products chiller includes an elongated tank having an inlet end for introducing fresh animal by-products and an outlet end for removing chilled by-products. The tank is rotatably supported on a set of trunnion wheels and is rotated by a chain and sprocket assembly operatively connected to a motor. A liquid coolant supply line from a coolant source introduces low temperature coolant into the tank. An elongated trough is positioned beneath the tank for receiving warmed coolant which drains from the tank through a plurality of apertures therein. A pump is operatively connected to the trough for recirculating the coolant back to the coolant source.

The method of chilling fresh animal by-products comprises introducing the by-products and liquid coolant from the coolant source into the chilling tank located at the slaughter location and rotating the tank such that the by-products therein are tumbled for complete exposure to the coolant. The by-products are pushed through the tank by additional incoming by-products and by the incoming liquid coolant. The coolant drains through the apertures in the tank into the receiving trough and is then recirculated by a pump to the coolant source where the coolant is recooled for subsequent use in chilling additional by-products.

22 Claims, 8 Drawing Figures

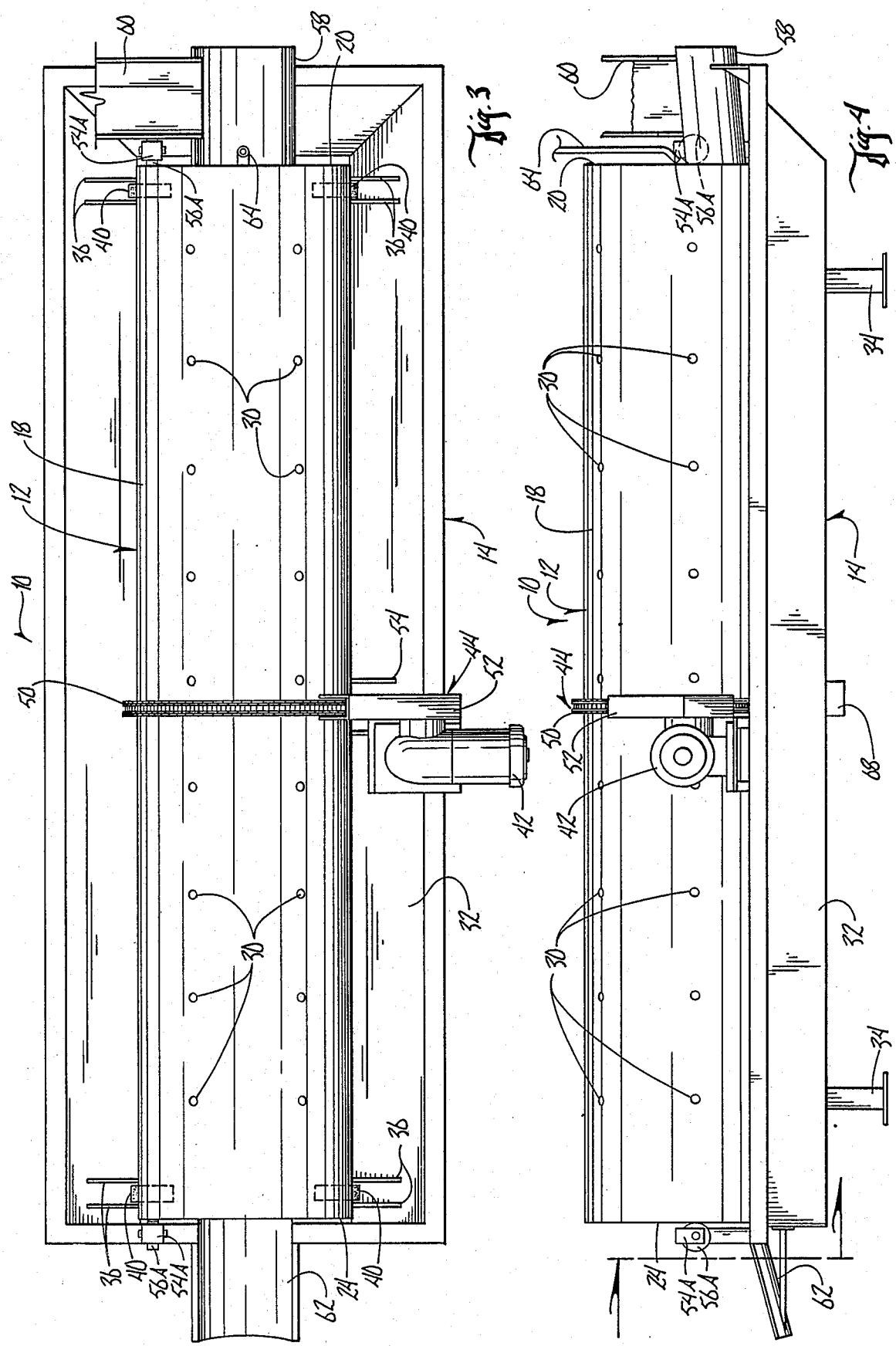

BY-PRODUCTS CHILLER AND METHOD FOR USING SAME

BACKGROUND OF THE INVENTION

Packing plant by-products, such as lungs, kidneys, hearts and other parts generally not consumed by humans, are often sold and used to make pet food. These by-products are initially at the body temperature of the butchered animal when removed therefrom, and are therefore highly susceptible to spoilage. Due to such potential for spoilage, the by-products have a very short life. The warm by-products must be quickly transported from the packing plant which slaughters the animal to the remote processing plant for conversion into pet food. Without such hurried pick up and delivery, the by-products become spoiled and must be discarded.

Therefore, it is a primary objective of the present invention to provide an on-site by-products chiller for lowering the temperature of fresh by-products, and thereby reducing potential for spoilage.

A further objective of the present invention is the provision of an on-site method and apparatus for chilling by-products which will prolong the life of by-products for further processing.

A further objective of the present invention is the provision of a method and apparatus for chilling animal by-products at the point of slaughter such that the by-products can be stored without spoilage prior to being shipped for further processing.

A further objective of the present invention is the provision of a method and apparatus for chilling by-products which eliminates the need to quickly transport the fresh by-products from the packing plant to the remote processing plant.

Another objective of the present invention is the provision of a by-products chiller and method for using the same wherein by-products are introduced into the chiller and exposed to a liquid coolant which reduces the temperature of the by-products prior to their exit from the chiller.

Still a further objective of the present invention is the provision of a by-products chiller and method for using the same which recirculates and reuses the liquid coolant for cooling the by-products therein.

A further objective of the present invention is the provision of a by-products chiller and a method for using the same which is economical to manufacture, and durable and efficient in use.

SUMMARY OF THE INVENTION

The packing plant by-products chiller of the present invention comprises an elongated tank having an inlet end and an outlet end through which fresh animal by-products are passed. The tank is rotatably supported on trunnion wheels and is rotated by a chain and sprocket gear assembly. A liquid coolant from a coolant source is introduced into the tank through a hose adjacent the inlet end thereof or through a plurality of nozzles positioned within the tank along the length thereof. The tank includes a plurality of agitator blades extending along the length thereof to facilitate the tumbling of the by-products within the tank as the tank is rotated. A plurality of apertures in the tank permits the coolant therein to drain into a trough, whereafter the coolant is filtered and pumped back to the coolant source for recooling and subsequent reuse in cooling additional by-products in the tank.

The method of preserving the perishable by-products includes introducing the fresh by-products into the chilling tank at the packing plant immediately after the animal has been slaughtered. Low temperature coolant is introduced into the tank which is rotated so as to expose the warm by-products therein to the coolant whereby the by-products are chilled. The by-products are forced through the tank by additional incoming by-products and coolant. The coolant drains through the apertures in the tank and is recirculated for chilling additional fresh by-products.

BRIEF DESCRIPTION OF THE DRAWINGS

FIG. 3 is a top plan view of the by-products chiller tank.

FIG. 4 is a side elevational view of the by-products chiller tank.

DETAILED DESCRIPTION OF THE PREFERRED EMBODIMENT

Figure 6:
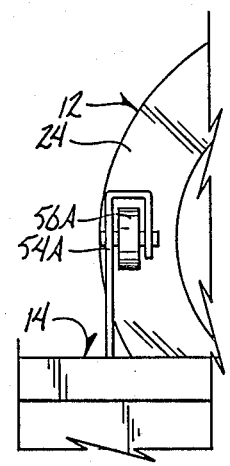
FIG. 6 is a view taken along lines 6—6 of FIG. 4.
Figure 7:
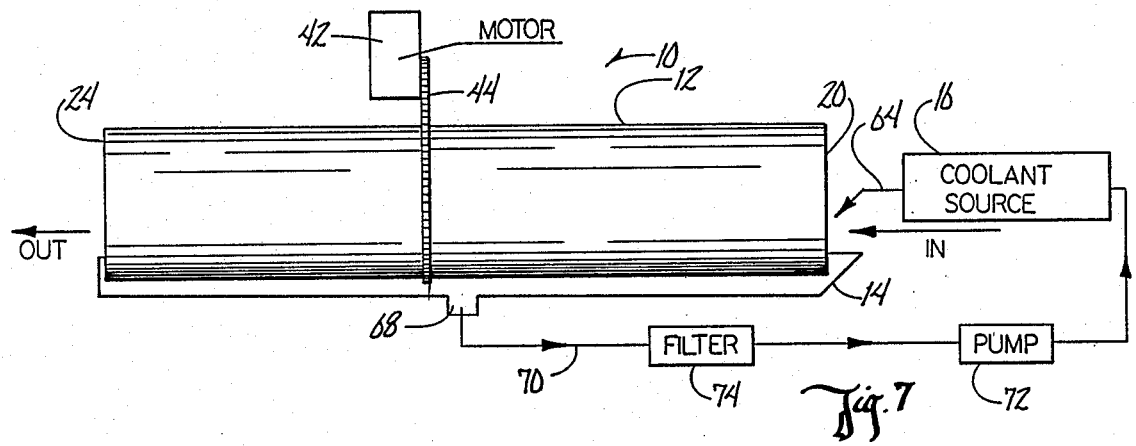
FIG. 7 is a schematic of the by-products chiller assembly of the present invention.
Figure 8:
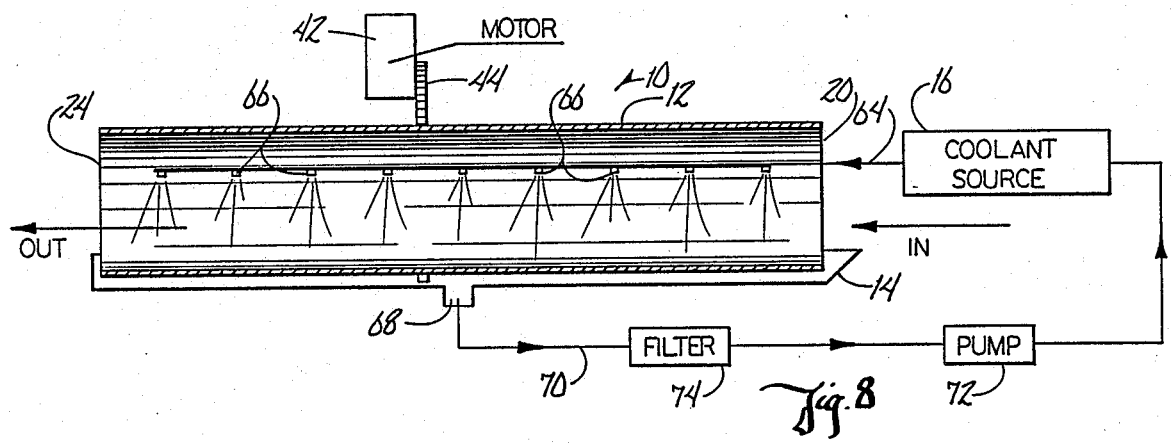
FIG. 8 is a schematic showing an alternate embodiment of the by-products chiller assembly of the present invention.

The by-products chiller of the present invention is generally designated in FIGS. 6 and 7 by the reference numeral 10. Chiller 10 is located at the packing plant where the animals are slaughtered, and basically comprises an elongated chilling tank 12 rotatably mounted above a drainage trough 14 and a liquid coolant supply source 16.

Referring to FIGS. 1–5, tank 12 includes a cylindrical body 18 having a first end 20 with an inlet opening 22 therein and a second end 24 with an outlet opening 26 therein. Body 18 of tank 12 is of single wall construction and has a plurality of apertures 30 therein for draining liquid coolant from the tank. Tank 12 also has a plurality of baffles 31 extending inwardly from the interior of body 18 along the length thereof.

Trough 14 includes a large receptacle 32 mounted upon a plurality of legs 34 and positioned beneath tank 12. Each end of receptacle 32 has two pairs of depending ears 36 extending inwardly therefrom, each pair of which supports an axle 38 upon which a trunnion wheel 40 is rotatably mounted. Each pair of trunnion wheels 40 at each end of receptacle 32 are positioned one on each side of the longitudinal axis of tank 12 and support tank 12 for rotation thereon. Legs 34 may be adjustable such that tank 12 may be inclined along its longitudinal axis.

Chiller 10 includes a means for rotating tank 12 about its longitudinal axis as it is supported by trunnion wheels 40. The rotation means generally comprises a motor 42 and a chain and sprocket assembly 44. More particularly, motor 42 is mounted upon trough 14 and has a first sprocket 46 conventionally and operatively connected thereto. A second sprocket 48 is fixed about the perimeter of tank body 18. A chain 50 drivingly interconnects first sprocket 46 and second sprocket 48 such that actuation of motor 42 causes tank 12 to rotate about its longitudinal axis. A housing 52 is attached to trough 14 so as to cover first sprocket 46 and at least a portion of chain 50 for safety purposes.

Figure 1:
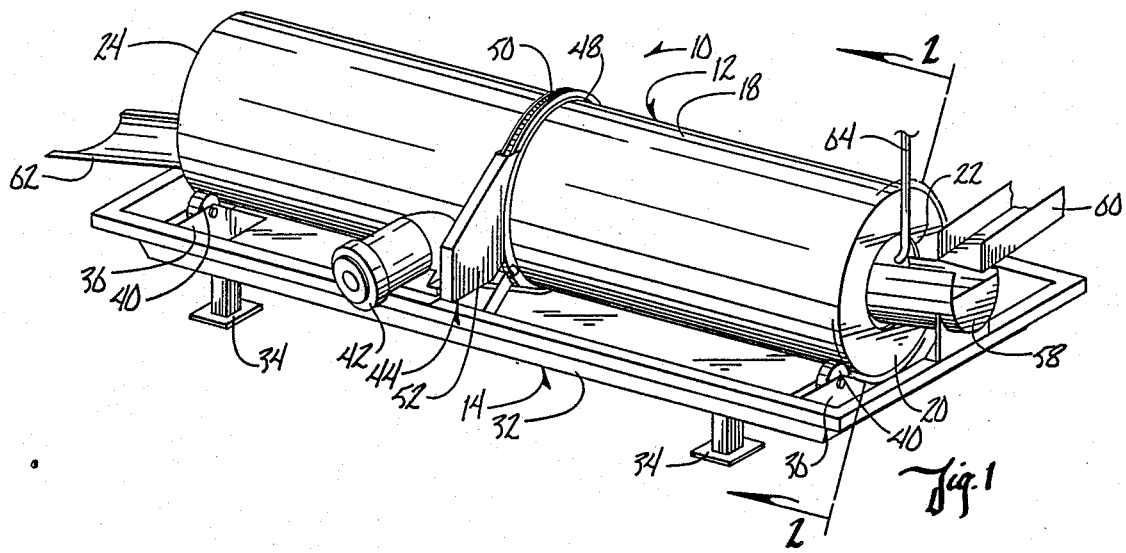
FIG. 1 is a perspective view of the by-products chiller tank of the present invention.
Figure 2:
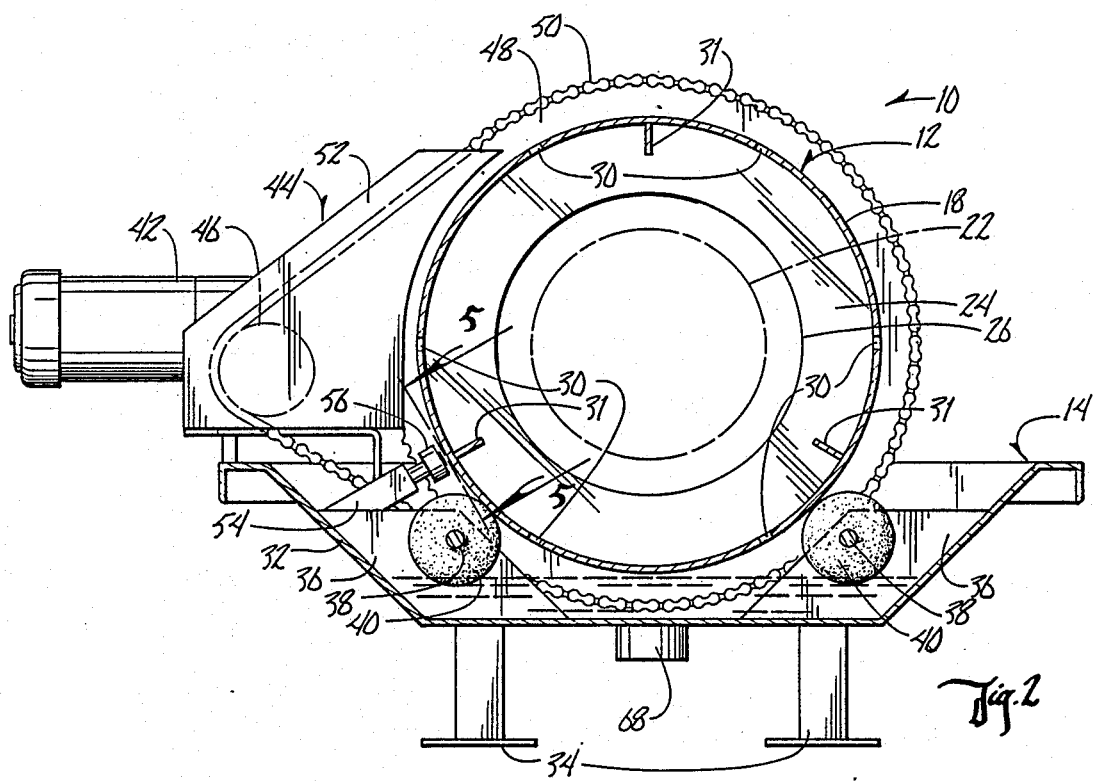
FIG. 2 is an end view taken along lines 2—2 of FIG. 1.
Figure 5:
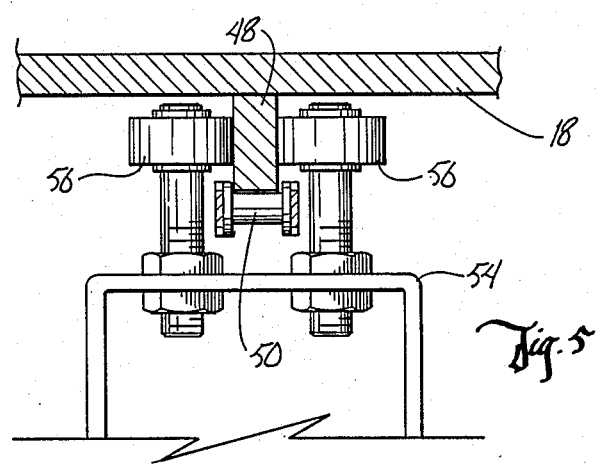
FIG. 5 is an enlarged sectional view taken along lines 5—5 of FIG. 2 showing the guidance rollers of the tank.

Also mounted upon trough 14 adjacent chain and sprocket assembly 44 is a bracket 54 to which are bolted a pair of guide rollers 56, as seen in FIG. 5. Guide rollers 56 engage opposite sides of second sprocket 48 so as to prevent tank 12 from moving longitudinally as the tank rotates upon trunnion wheels 40. As an alternative to brackets 54 and guide rollers 56, bracket 54A can be mounted at each end of tank 12 with a guide roller 56A rotatably mounted thereon, as seen in FIGS. 4-6, for engaging the ends of tank 12 and preventing the tank from moving longitudinally during rotation of the tank on trunnion wheels 40.

An inlet chute 58 extends through inlet opening 22 so as to deposit animal by-products from a conveyor 60 to the interior of tank 12. The by-products are removed from tank 12 via an outlet chute 62 extending from outlet opening 26 of tank 12.

A coolant supply line 64 extends from coolant source 16 at least to chute 58 and supplies a liquid coolant, such as water, from coolant source 16. In the embodiment shown in FIGS. 1-6, coolant supply lines 64 terminates adjacent first end 20 of tank 12, however, as seen in FIG. 7, line 64 may extend along the length of tank 12 and include a plurality of spray nozzles 66 for uniform distribution of coolant throughout tank 12.

Trough 14 also includes a drain 68 for draining coolant from receptacle 32. A coolant return line 70 is connected to drain 68 at one end and to coolant source 16 at the other end. A pump 72 is disposed in return line 70 for pumping coolant from receptacles 32 to coolant source 16. A filter 74 is disposed in return line 70 upstream of pump 72 for removing solids from the liquid coolant. The coolant which is passed through tank 12 and trough 14 is thereby recirculated back to coolant source 16, wherein it is cooled for subsequent reuse in chilling additional by-products.

In the packing plant chilling operation, a quantity of fresh animal by-products are deposited on inlet chute 58 from conveyor 60 wherein they pass through inlet opening 22 into tank 12. Liquid coolant at approximately 33° F. from coolant source 16 is also introduced into tank 12 for lowering the temperature of the hot by-products. Tank 12 is rotated upon trunnion wheels by motor 42 and chain and sprocket assembly 44. Such rotation of tank 12 causes the by-products therein to tumble so as to be completely exposed to the lower temperature coolant. Baffles 31 facilitate the tumbling of the by-products. Introduction of additional by-products and coolant pushes the previously introduced by-products through tank 12 and out outlet opening 28 onto outlet chute 62 wherein the by-products are removed for later processing into pet food or the like.

As the by-products and coolant moves longitudinally through tank 12, the coolant picks up heat from the by-products, thereby lowering the temperature of the by-products and reducing the potential for spoilage. The warmed coolant drains from rotating tank 12 through apertures 30 and into receptacle 32. The warmed coolant in receptacle 32 can be drained through drain 68 into return line 70 and pumped by pump 72 back to coolant source 16. Coolant source 16 includes a cooling means (not shown) for re-cooling the coolant to approximately 33° F. such that the coolant can be reused to chill additional by-products. At selected periodic intervals, the used coolant can be disposed and replaced with fresh coolant.

During the on-site chilling operation of the present invention, the by-products remain in tank 12 for approximately ten to twelve minutes. The coolant temperature entering tank 12 is initially 33° F. such that the final temperature of the by-products exiting tank 12 through outlet opening 26 therein is substantially less than the warm body temperature of the slaughtered animal at which the by-products enter tank 12. The chance of spoilage is therefore minimized and the life of the by-products is prolonged. Thus, the need to rush the warm by-products from the packing plant to the remote processing plant is eliminated.

Therefore, it can be seen that the present invention accomplishes at least all of the stated objectives.

What is claimed is:

1. A by-product chiller comprising:
   an elongated tank having an inlet end for introducing fresh animal by-products into said tank and an outlet end for removing said by-products from said tank, and having agitator and tumbling means on the interior thereof,
   support means for rotatably supporting said tank,
   means for introducing a liquid coolant from a coolant source into said tank for cooling said by-products therein,
   an elongated trough positioned below said tank, said tank having a plurality of apertures therein for draining said coolant therefrom into said trough,
   pump means operatively connected to said trough for recirculating said coolant drained from said tank into said trough to said coolant source for re-cooling thereby and for subsequent re-introduction into said tank for cooling additional by-products therein, said cooling source being remote from said trough, and
   means operatively connected to said tank for rotating said tank about its longitudinal axis such that said by-products are tumbled within said tank for exposure to said coolant and chilled thereby.

2. The chiller of claim 1 wherein said means for rotating said tank includes a first sprocket circumferentially mounted on said tank intermediate the opposite ends thereof, a power means having a rotatable drive sprocket operatively connected thereto, and a chain means drivingly interconnecting said drive sprocket and said first sprocket.

3. The chiller of claim 2 further comprising stabilizer means engaging said tank for preventing said tank from moving longitudinally while rotating.

4. The chiller of claim 3 wherein said stabilizer means includes a pair of rotatable guidance wheels engaging opposite sides of said first sprocket.

5. The chiller of claim 3 wherein said stabilizer means includes a rotatable guidance wheel engaging each end of said tank.

6. The chiller of claim 1 wherein said support means is a plurality of rotatable trunnion wheels.

7. The chiller of claim 1 wherein said trough includes drainage means for draining said coolant therefrom.

8. The chiller of claim 1 wherein said means for introducing said coolant into said tank includes a plurality of spray nozzles positioned within said tank along the length thereof and being in fluid communication with said coolant source.

9. The chiller of claim 1 wherein said agitator and tumbling means includes a plurality of blades extending longitudinally along the interior of said tank.

10. The chiller of claim 1 further comprising a filter positioned upstream of said pump means for removing solids from said liquid coolant prior to recirculation of said coolant to said coolant source.

11. The chiller of claim 1 wherein said tank is of single wall construction.

12. The chiller of claim 1 wherein said means for introducing liquid coolant into said tank introduces such coolant into said tank at least adjacent said inlet end of said tank.

13. A method of preserving fresh animal by-products which are to be further processed, comprising: introducing warm by-products into the inlet end of an elongated chilling tank at the slaughter vicinity; introducing liquid coolant from a coolant source into said tank, rotating said tank such that said by-products are tumbled therein for exposure to said coolant whereby heat is transferred from said by-products to said coolant thereby chilling said by-products to eliminate spoilage thereof, removing said chilled by-products from the outlet end of said tank, draining said coolant from said tank into a receptacle, pumping said coolant from said receptacle to said coolant source for re-cooling thereby whereafter said coolant is re-introduced into said tank for chilling additional by-products, said coolant source being remote from said receptacle, storing the chilled by-products at the slaughter vicinity until said chilled by-products are transported for further processing.

14. The method of claim 13 further comprising continuously draining said coolant from said tank during rotation thereof.

15. The method of claim 14 wherein said coolant is drained from said tank through a plurality of apertures therein.

16. The method of claim 13 wherein introduction of additional by-products into said tank forces the previously introduced by-products through said tank.

17. The method of claim 13 wherein said introduction of said coolant into said tank forces said by-products through said tank.

18. The method of claim 13 wherein said coolant is introduced into said tank through a plurality of spray nozzles positioned therein.

19. The method of claim 13 further comprising agitating said by-product to facilitate chilling thereof by said coolant.

20. The method of claim 13 wherein the temperature of said coolant from said coolant source is approximately 33° F.

21. The method of claim 13 wherein said by-products remain in said tank for approximately 10–12 minutes.

22. The method of claim 13 wherein said liquid coolant is introduced into said tank at least adjacent said inlet end thereof.

* * * * *